US011187318B2

(12) United States Patent
Inoue et al.

(10) Patent No.: US 11,187,318 B2
(45) Date of Patent: Nov. 30, 2021

(54) VEHICLE

(71) Applicant: SUBARU CORPORATION, Tokyo (JP)

(72) Inventors: Satoshi Inoue, Tokyo (JP); Kazuhiro Yoshida, Tokyo (JP); Takuya Machida, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/060,335

(22) Filed: Oct. 1, 2020

(65) Prior Publication Data
US 2021/0123526 A1 Apr. 29, 2021

(30) Foreign Application Priority Data

Oct. 24, 2019 (JP) .............. JP2019-193226

(51) Int. Cl.
| F16H 59/18 | (2006.01) |
| F16H 61/66 | (2006.01) |
| B60W 10/101 | (2012.01) |
| B60W 20/20 | (2016.01) |
| B60K 6/22 | (2007.10) |
| F16H 61/662 | (2006.01) |
| F16H 59/44 | (2006.01) |

(52) U.S. Cl.
CPC .............. *F16H 59/18* (2013.01); *F16H 59/44* (2013.01); *F16H 61/662* (2013.01)

(58) Field of Classification Search
CPC ........ F16H 59/18; F16H 59/44; F16H 61/662; B60W 10/101; B60W 20/20; B60K 6/22
See application file for complete search history.

(56) References Cited

U.S. PATENT DOCUMENTS

| 10,967,860 B2* | 4/2021 | Takemori | ............ F16H 61/0213 |
| 2007/0118266 A1* | 5/2007 | Hino | ................ F16H 61/66259 |
| | | | 701/51 |

FOREIGN PATENT DOCUMENTS

| EP | 1164315 A2 * | 12/2001 | ....... F16H 61/66259 |
| JP | 2014-97773 A | 5/2014 | |

* cited by examiner

*Primary Examiner* — Tisha D Lewis
(74) *Attorney, Agent, or Firm* — McDermott Will & Emery LLP

(57) ABSTRACT

A vehicle includes an engine; a continuously variable transmission; an output clutch disposed between the continuously variable transmission and the drive wheel; a drive motor coupled between the output clutch and the drive wheel; a traveling mode controller; and a speed ratio controller. In a case where required driving power based on an accelerator position is less than a first threshold, the traveling mode controller switches a traveling mode to a first traveling mode. In a case where the required driving power is equal to or greater than the first threshold, the traveling mode controller switches the traveling mode to a second traveling mode. In a case where the required driving power is less than the first threshold and equal to or greater than a second threshold, the speed ratio controller causes a speed ratio of the continuously variable transmission to change depending on a vehicle speed.

3 Claims, 6 Drawing Sheets

VEHICLE

CROSS-REFERENCE TO RELATED APPLICATIONS

The present application claims priority from Japanese Patent Application No. 2019-193226 filed on Oct. 24, 2019, the entire contents of which are hereby incorporated by reference.

BACKGROUND

The technology relates to a vehicle.

Techniques have been proposed to switch a traveling mode between a hybrid electric vehicle (HEV) traveling mode and an electric vehicle (EV) traveling mode. For example, Japanese Unexamined Patent Application Publication No. 2014-97773 discloses a hybrid vehicle the traveling mode of which is switched from the HEV traveling mode to the EV traveling mode by switching a clutch provided between a continuously variable transmission and a drive wheel from an engaged state to a released state and changing the speed ratio of the continuously variable transmission to a minimum or maximum speed ratio.

SUMMARY

An aspect of the technology provides a vehicle including an engine, a continuously variable transmission, an output clutch, a drive motor, a traveling mode controller, and a speed ratio controller. The continuously variable transmission is coupled to the engine and configured to transmit driving power of the engine to a drive wheel. The output clutch is disposed between the continuously variable transmission and the drive wheel. The drive motor is coupled between the output clutch and the drive wheel. The traveling mode controller is configured to switch a traveling mode of the vehicle between a first traveling mode and a second traveling mode. In the first traveling mode, the traveling mode controller causes driving power of the drive motor to be transmitted to the drive wheel while releasing the output clutch. In the second traveling mode, the traveling mode controller causes the driving power of the engine and the driving power of the drive motor to be transmitted to the drive wheel while engaging the output clutch. The traveling mode controller is configured to switch the traveling mode to the first traveling mode in a case where required driving power determined on the basis of an accelerator position is less than a first threshold, and switch the traveling mode to the second traveling mode in a case where the required driving power is equal to or greater than the first threshold. The speed ratio controller is configured to control a speed ratio of the continuously variable transmission. In a case where the required driving power is less than the first threshold and equal to or greater than a second threshold, the speed ratio controller is configured to cause the speed ratio to change depending on a vehicle speed of the vehicle. The second threshold is set to a value less than the first threshold.

An aspect of the technology provides a vehicle including an engine, a continuously variable transmission, an output clutch, a drive motor, and circuitry. The continuously variable transmission is coupled to the engine and configured to transmit driving power of the engine to a drive wheel. The output clutch is disposed between the continuously variable transmission and the drive wheel. The drive motor is coupled between the output clutch and the drive wheel. The circuitry is configured to switch a traveling mode of the vehicle between a first traveling mode and a second traveling mode. In the first traveling mode, the circuitry causes driving power of the drive motor to be transmitted to the drive wheel while releasing the output clutch. In the second traveling mode, the circuitry causes the driving power of the engine and the driving power of the drive motor to be transmitted to the drive wheel while engaging the output clutch. The circuitry is also configured to: switch the traveling mode to the first traveling mode in a case where required driving power determined on the basis of an accelerator position is less than a first threshold; switch the traveling mode to the second traveling mode in a case where the required driving power is equal to or greater than the first threshold; control a speed ratio of the continuously variable transmission; and cause the speed ratio of the continuously variable transmission to change depending on a vehicle speed of the vehicle in a case where the required driving power is less than the first threshold and equal to or greater than a second threshold. The second threshold is set to a value less than the first threshold.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

An optimal speed ratio to switching a traveling mode from the EV traveling mode to the HEV traveling mode differs depending on a traveling state of a vehicle. If the speed ratio has not been reached a target speed ratio before the traveling mode is switched from the EV traveling mode to the HEV traveling mode, the speed ratio needs to be changed to the target speed ratio to switch the traveling mode from the EV traveling mode to the HEV traveling mode. This can increase transition time of the traveling mode from the EV traveling mode to the HEV traveling mode.

A possible measure to reduce the transition time of the traveling mode from the EV traveling mode to the HEV traveling mode is to constantly change the speed ratio of the continuously variable transmission on the basis of the traveling state of the vehicle while the vehicle is traveling in the EV traveling mode. However, such a measure can generate energy loss. It has thus been difficult to reduce the mode transition time and the energy loss in a compatible way.

It is desirable to provide a vehicle that reduces mode transition time and energy loss in a compatible way.

Some example embodiments of the technology will now be described in detail with reference to the accompanying drawings. Note that the following description is directed to illustrative examples of the technology and not to be construed as limiting to the technology. Factors including, without limitation, dimensions, materials, and other numerical values are illustrative only and not to be construed as limiting to the technology unless otherwise noted. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description. Illustration of elements not directly relevant to the example embodiments of the technology is omitted in the accompanying drawings.

Figure 1:
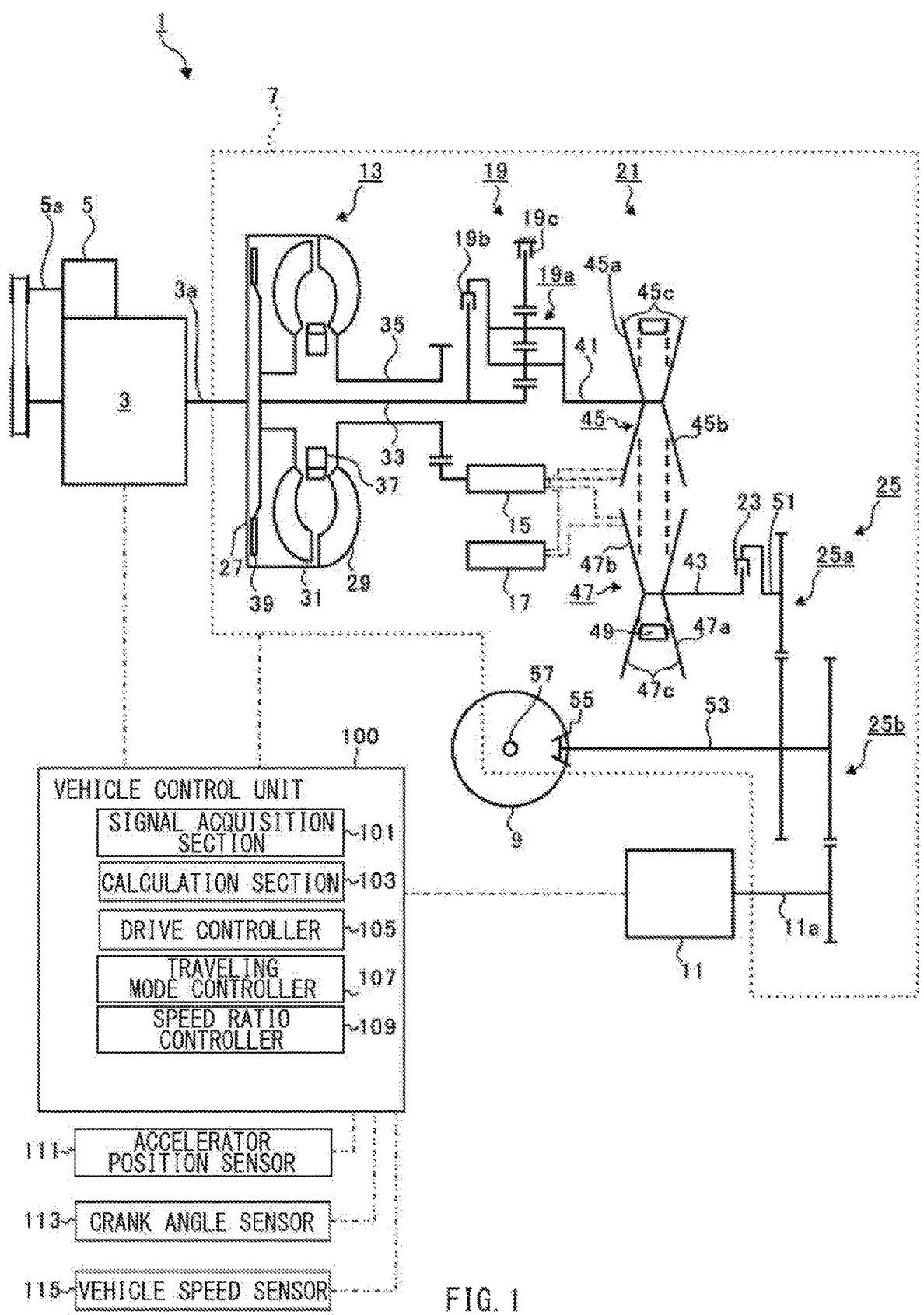
FIG. 1 is a diagram illustrating an example configuration of a vehicle according to one example embodiment of the technology.

FIG. 1 illustrates an example configuration of a vehicle 1 according to an example embodiment of the technology. As illustrated in FIG. 1, the vehicle 1 may include an engine 3, an integrated starter generator (ISG) 5, a power transmission apparatus 7, a drive wheel 9, a drive motor 11, and a vehicle control unit 100.

The engine 3 may include a crank shaft 3a coupled to the power transmission apparatus 7. For example, the engine 3 may be a reciprocating engine that rotates the crank shaft 3a by reciprocating a piston using combustion pressure in a combustion chamber.

The ISG 5 may include a rotary shaft 5a coupled to the crank shaft 3a of the engine 3 via a pulley and a belt. The ISG 5 may serve as a motor that starts (restarts) the engine 3 and a generator that generates electric power.

The power transmission apparatus 7 may include a torque converter 13, a mechanical oil pump 15, an electric oil pump 17, a forward/backward movement switching device 19, a continuously variable transmission 21, an output clutch 23, and a gear mechanism 25. The power transmission apparatus 7 may transmit driving power of the engine 3 and driving power of the drive motor 11 to the drive wheel 9.

The torque converter 13 may include a front cover 27, a pump impeller 29, a turbine runner 31, a turbine shaft 33, a pump shaft 35, a stator 37, and a clutch plate 39. The torque converter 13 may contain oil.

The front cover 27 may be coupled to the crank shaft 3a so as to rotate integrally with the crank shaft 3a. The pump impeller 29 may be fixed to an inner side of the front cover 27. The turbine runner 31 may face the pump impeller 29 in the front cover 27.

The pump impeller 29 and the turbine runner 31 may be provided with multiple blades. The turbine runner 31 may be coupled to the turbine shaft 33 so as to rotate integrally with the turbine shaft 33.

The pump shaft 35 may have a hollow cylindrical shape. The pump shaft 35 may be coupled to the pump impeller 29 so as to rotate integrally with the pump impeller 29. The turbine shaft 33 may extend through the internal space of the pump shaft 35 with a space from the internal surface of the pump shaft 35. The stator 37 may be disposed between the pump impeller 29 and the turbine runner 31 so as to be adjacent to inner peripheral surfaces of the pump impeller 29 and the turbine runner 31.

Rotating the crank shaft 3a may cause the front cover 27 and the pump impeller 29 to rotate integrally with the crank shaft 3a. Rotating the pump impeller 29 may deliver oil to an outer periphery of the pump impeller 29 and then to an outer periphery of the turbine runner 31 along an inner peripheral surface of the front cover 27.

The oil flowing into the turbine runner 31 may cause the turbine runner 31 to rotate. Rotating the turbine runner 31 may cause the turbine shaft 33 to rotate integrally with the turbine runner 31, which transmit driving power from the crank shaft 3a to the turbine shaft 33.

The stator 37 may deliver oil from the turbine runner 31 to the pump impeller 29. The stator 37 may flow the oil back to the pump impeller 29 to facilitate rotations of the pump impeller 29. This allows the torque converter 13 to amplify the torque to be transmitted from an input side adjacent to the crank shaft 3a to an output side adjacent to the turbine shaft 33.

The clutch plate 39 may be fixed to the turbine shaft 33. The clutch plate 39 may face the inner surface of the front cover 27. Pressing the clutch plate 39 against the inner surface of the front cover 27 using the oil pressure inside the torque converter 13 may directly couple the crank shaft 3a and the turbine shaft 33. This improves efficiency in transmitting the driving power from the crank shaft 3a to the turbine shaft 33.

The pressing force of the clutch plate 39 against the inner surface of the front cover 27 may be controlled by controlling the oil pressure inside the torque converter 13. As the pressing force of the clutch plate 39 decreases, the clutch plate 39 may slide on the inner surface of the front cover 27 while being in contact with the inner surface of the front cover 27. This allows the clutch plate 39 to adjust the driving power to be transmitted from the crank shaft 3a to the turbine shaft 33.

The mechanical oil pump 15 may be coupled to the pump shaft 35. The mechanical oil pump 15 may be rotationally driven by the driving power of the engine 3 transmitted via the pump shaft 35 to generate oil pressure. The generated oil pressure may be supplied to the continuously variable transmission 21.

The electric oil pump 17 may be rotationally driven by driving power of a non-illustrated motor to generate oil pressure. The generated oil pressure may be supplied to the continuously variable transmission 21. The electric oil pump 17 may generate oil pressure mainly using electric power outputted from a non-illustrated battery to a non-illustrated motor while the engine 3 is stopped.

The forward/backward movement switching device 19 may be disposed between the turbine shaft 33 of the torque converter 13 and a primary shaft 41 of the continuously variable transmission 21. The forward/backward movement switching device 19 may include a planetary gear train 19a of a double-pinion type, an input clutch (forward clutch) 19b, and a reverse brake 19c. When the input clutch 19b and the reverse brake 19c are released, the forward/backward movement switching device 19 may be in a neutral state, which cuts off the transmission of the driving power between the turbine shaft 33 and the primary shaft 41. When the input clutch 19b is engaged and the reverse brake 19c is released, the forward/backward movement switching device 19 may cause the turbine shaft 33 and the primary shaft 41 to rotate integrally with each other to transmit driving power from the turbine shaft 33 to the primary shaft 41. When the input clutch 19b is released and the reverse brake 19c is engaged, the forward/backward movement switching device 19 may cause the primary shaft 41 to rotate in a direction opposite to the rotational direction of the turbine shaft 33 to transmit inverted driving power from the turbine shaft 33 to the primary shaft 41.

The continuously variable transmission 21 may include the primary shaft 41, a secondary shaft 43, a primary pulley 45, a secondary pulley 47, and a belt 49. The primary shaft 41 may be coupled to the forward/backward movement switching device 19. The secondary shaft 43 may be coupled to the output clutch 23. The secondary shaft 43 may be provided substantially parallel to the primary shaft 41.

The primary pulley 45 may be coupled to the primary shaft 41 so as to rotate integrally with the primary shaft 41. The secondary pulley 47 may be coupled to the secondary shaft 43 so as to rotate integrally with the secondary shaft 43.

The belt 49 may be a chain belt including link plates joined to each other with pins, for example. Alternatively, the belt 49 may be a metal belt including a plurality of pieces (elements) each held between two rings. The belt 49 may be wound around the primary pulley 45 and the secondary pulley 47 to transmit driving power between the primary pulley 45 and the secondary pulley 47.

The primary pulley 45 may include a fixed sheave 45a and a moving sheave 45b. The fixed sheave 45a may be opposed to the moving sheave 45b in the axial direction of the primary shaft 41. The fixed sheave 45a and the moving sheave 45b may have respective counterface surfaces 45c facing each other. The counterface surfaces 45c may have a substantially conical shape. The counterface surfaces 45c may define a groove on which the belt 49 is wound. The pressure of oil supplied from the mechanical oil pump 15 or the electric oil pump 17 may move the moving sheave 45b along the axis of the primary shaft 41.

The secondary pulley 47 may include a fixed sheave 47a and a moving sheave 47b. The fixed sheave 47a may be opposed to the moving sheave 47b in the axial direction of the secondary shaft 43. The fixed sheave 47a and the moving sheave 47b may have respective counterface surfaces 47c facing each other. The counterface surfaces 47c may have a substantially conical shape. The counterface surfaces 47c may define a groove on which the belt 49 is wound. The pressure of oil supplied from the mechanical oil pump 15 or the electric oil pump 17 may move the moving sheave 47b along the axis of the secondary shaft 43.

Accordingly, the fixed sheave 45a and the moving sheave 45b of the primary pulley 45 may face each other at a variable gap, and the fixed sheave 47a and the moving sheave 47b of the secondary pulley 47 may face each other at a variable gap. The gap between the counterface surfaces 45c and the gap between the counterface surfaces 47c may become smaller along the inner radial direction and become larger along the outer radial direction. Thus, when the moving sheave 45b and the moving sheave 47b move in the axial direction, the position at which the belt 49 is wounded may be changed in the radial direction.

As the gap between the counterface surfaces 45c of the primary pulley 45 becomes larger, the position at which the belt 49 is wound may be moved in the inner radial direction, reducing the winding diameter of the belt 49. In contrast, as the gap between the counterface surfaces 45c of the primary pulley 45 becomes smaller, the position at which the belt 49 is wound may be moved in the outer radial direction, increasing the winding diameter of the belt 49.

Similarly, as the gap between the counterface surfaces 47c of the secondary pulley 47 becomes larger, the position at which the belt 49 is wound may be moved in the inner radial direction, reducing the winding diameter of the belt 49. In contrast, as the gap between the counterface surfaces 47c of the secondary pulley 47 becomes smaller, the position at which the belt 49 is wound may be moved in the outer radial direction, increasing the winding diameter of the belt 49.

In this way, the continuously variable transmission 21 may continuously (steplessly) change a speed ratio between the primary shaft 41 and the secondary shaft 43. The continuously variable transmission 21 may transmit the driving power received from the engine 3 via the forward/backward movement switching device 19 and the torque converter 13 to the drive wheel 9.

The output clutch 23 may be disposed between the secondary shaft 43 of the continuously variable transmission 21 and a gear shaft 51 of the gear mechanism 25. When being released, the output clutch 23 may cut off the transmission of the driving power between the secondary shaft 43 and the gear shaft 51. That is, when being released, the output clutch 23 may prevent the driving power from being transmitted from the drive wheel 9 to the continuously variable transmission 21 or the engine 3. When being engaged, the output clutch 23 may cause the secondary shaft 43 and the gear shaft 51 to rotate integrally with each other to transmit driving power from the secondary shaft 43 to the gear shaft 51. That is, when being engaged, the output clutch 23 may transmit driving power from the continuously variable transmission 21 or the engine 3 to the drive wheel 9.

The gear mechanism 25 may include the gear shaft 51, a drive pinion shaft 53, a first reduction gear train 25a, and a second reduction gear train 25b.

The gear shaft 51 may be coupled to the output clutch 23. The drive pinion shaft 53 may be coupled to a differential 55. The first reduction gear train 25a may couple the gear shaft 51 and the drive pinion shaft 53. The first reduction gear train 25a may reduce the rotation speed of the gear shaft 51 and transmit the reduced rotation speed to the drive pinion shaft 53. The drive pinion shaft 53 may be coupled to the drive wheel 9 via the differential 55 and an axle shaft 57. The driving power transmitted from the gear shaft 51 may be transmitted to the drive wheel 9 via the first reduction gear train 25a, the drive pinion shaft 53, the differential 55, and the axle shaft 57.

The drive motor 11 may include a motor shaft 11a. The drive motor 11 may output the driving power received from a non-illustrated battery to the motor shaft 11a. In the example embodiment, the drive motor 11 may be a motor generator that performs a driving operation and electric power generation (regenerative operation). The motor shaft 11a may be coupled to the second reduction gear train 25b. The second reduction gear train 25b may couple the motor shaft 11a and the drive pinion shaft 53. The second reduction gear train 25b may reduce the rotation speed of the motor shaft 11a and transmit the reduced rotation speed to the drive pinion shaft 53. The driving power transmitted from the motor shaft 11a may be transmitted to the drive wheel 9 via the second reduction gear train 25b, the drive pinion shaft 53, the differential 55, and the axle shaft 57.

The vehicle control unit 100 may be a microcomputer including a central processing circuit (CPU), a read-only memory (ROM) storing programs or the like, and a random-access memory (RAM) serving as a work area, for example. The vehicle control unit 100 may comprehensively control the entire vehicle 1. In the example embodiment, the vehicle control unit 100 may include a signal acquisition section 101, a calculation section 103, a drive controller 105, a traveling mode controller 107, and a speed ratio controller 109.

To the vehicle control unit 100, an accelerator position sensor 111, a crank angle sensor 113, and a vehicle speed sensor 115 may be coupled, for example. The accelerator position sensor 111 may detect an amount of depression (accelerator position) of a non-illustrated accelerator pedal, and output a detection signal indicative of the accelerator position to the vehicle control unit 100. The crank angle sensor 113 may detect a rotation angle of the crank shaft 3a, and output a detection signal indicative of the crank angle to the vehicle control unit 100. The vehicle speed sensor 115 may detect a speed of the vehicle 1 (hereinafter referred to as vehicle speed), and output a detection signal indicative of the vehicle speed to the vehicle control unit 100.

The signal acquisition section 101 may acquire detection signals outputted from various sensors. For example, the signal acquisition section 101 may acquire detection signals outputted from the accelerator position sensor 111, the crank angle sensor 113, and the vehicle speed sensor 115.

The calculation section 103 may calculate the number of engine revolutions on the basis of the detection signal outputted from the crank angle sensor 113. The calculation section 103 may also calculate a vehicle speed of the vehicle 1 on the basis of the detection signal outputted from the vehicle speed sensor 115. The calculation section 103 may also calculate an accelerator position on the basis of the detection signal outputted from the accelerator position sensor 111. The calculation section 103 may also calculate driving power required by the driver on the vehicle 1 on the basis of the calculated accelerator position. In other words, the required driving power may be determined on the basis of the accelerator position.

The drive controller 105 may control the driving or the driving power of the engine 3 and the driving or the driving power of the drive motor 11 on the basis of the required driving power calculated by the calculation section 103.

The traveling mode controller 107 switches the traveling mode of the vehicle 1. In the example embodiment, the traveling mode controller 107 switches the traveling mode of the vehicle 1 between the EV traveling mode and the HEV traveling mode, for example. In one embodiment, the EV traveling mode may serve as a "first traveling mode". In one embodiment, the HEV traveling mode may serve as a "second traveling mode". In the EV traveling mode, the vehicle 1 may travel preferentially using the drive motor 11. That is, in the EV traveling mode, the vehicle 1 may travel using only the drive motor 11 rather than the engine 3. In the HEV traveling mode, the vehicle 1 may travel using both of the engine 3 and the drive motor 11.

The traveling mode controller 107 switches the traveling mode of the vehicle 1 between the EV traveling mode and the HEV traveling mode on the basis of the required driving power calculated by the calculation section 103. For example, in a case where the driving power required by the driver is equal to or greater than a threshold variable depending on a vehicle speed, the traveling mode controller 107 switches the traveling mode of the vehicle 1 to the HEV traveling mode. In a case where the required driving power is less than the threshold, the traveling mode controller 107 switches the traveling mode of the vehicle 1 to the EV traveling mode.

Figure 2:
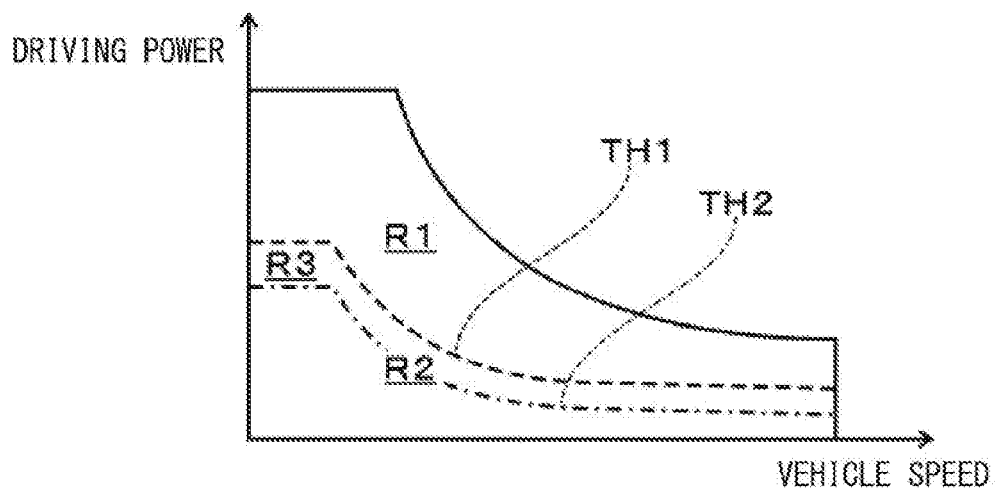
FIG. 2 is a diagram illustrating driving power in each traveling mode of the vehicle according to one example embodiment of the technology.

FIG. 2 illustrates driving power of the vehicle 1 in each traveling mode. In FIG. 2, a vertical axis represents required driving power, and a horizontal axis represents a vehicle speed. In FIG. 2, "TH1" represents a first threshold variable depending on the vehicle speed, "R1" represents an HEV traveling range, and "R2" represents an EV traveling range. The HEV traveling range R1 may be a part of an entire traveling range of the vehicle 1. In the HEV traveling range R1, the required traveling power is equal to or greater than the first threshold TH1. The EV traveling range R2 may be a part of the entire traveling range of the vehicle 1. In the EV traveling range R2, the required driving power is less than the first threshold TH1.

As illustrated in FIG. 2, the traveling mode controller 107 switches the traveling mode of the vehicle 1 to the HEV traveling mode in a case where the required driving power is within the HEV traveling range R1 equal to or greater than the first threshold TH1. In contrast, the traveling mode controller 107 switches the traveling mode of the vehicle 1 to the EV traveling mode in a case where the required driving power is within the EV traveling range R2 less than the first threshold TH1.

In the EV traveling mode, the traveling mode controller 107 may stop driving the engine 3, release the input clutch 19b and the output clutch 23, and drive the drive motor 11. Accordingly, in the EV traveling mode, the traveling mode controller 107 causes the driving power of the drive motor 11 to be transmitted to the drive wheel 9 while releasing the output clutch 23.

Releasing the output clutch 23 may prevent the driving power from being transmitted from the drive motor 11 to the continuously variable transmission 21, the forward/backward movement switching device 19, the torque converter 13, and the engine 3 stopped. This allows the vehicle 1 to travel using smaller driving power of the drive motor 11 than when the output clutch 23 is engaged. Accordingly, it is possible to improve the efficiency in electric power consumption.

In the HEV traveling mode, the traveling mode controller 107 may drive the engine 3, engage the input clutch 19b and the output clutch 23, and drive the drive motor 11. Accordingly, in the HEV traveling mode, the traveling mode controller 107 causes the driving power of the engine 3 and the driving power of the drive motor 11 to be transmitted to the drive wheel 9 while engaging the output clutch 23.

Engaging the output clutch 23 may transmit the driving power of the engine 3 and the driving power of the drive motor 11 to the drive wheel 9. Accordingly, if the driving power of the drive motor 11 is insufficient to cover the driving power required by the driver, the driving power of the engine 3 may be added to the driving power of the drive motor 11 to cover the driving power required by the driver.

The speed ratio controller 109 may control the speed ratio (pulley ratio) of the continuously variable transmission 21. In a case where the vehicle 1 is traveling in the HEV traveling mode, the speed ratio controller 109 may change the speed ratio of the continuously variable transmission 21 using the pressure of oil supplied from the mechanical oil pump 15.

In contrast, in a case where the vehicle 1 is traveling in the EV traveling mode, the speed ratio controller 109 may temporarily engage the output clutch 23 to rotationally drive the continuously variable transmission 21. At that time, the traveling mode controller 107 may release the input clutch 19b, which prevents the rotational driving of the continuously variable transmission 21 from being transmitted to the engine 3. The speed ratio controller 109 may change the speed ratio of the continuously variable transmission 21 using the pressure of oil supplied from the electric oil pump 17 while rotationally driving the continuously variable transmission 21. After changing the speed ratio, the speed ratio controller 109 may release the engagement of the output clutch 23 to switch the output clutch 23 to a released state.

The speed ratio controller 109 may change the speed ratio of the continuously variable transmission 21 on the basis of the vehicle speed of the vehicle 1 and the accelerator position. For example, the speed ratio controller 109 may derive the speed ratio of the continuously variable transmission 21 from a speed-change map preliminarily stored in a non-illustrated memory.

Figure 3:
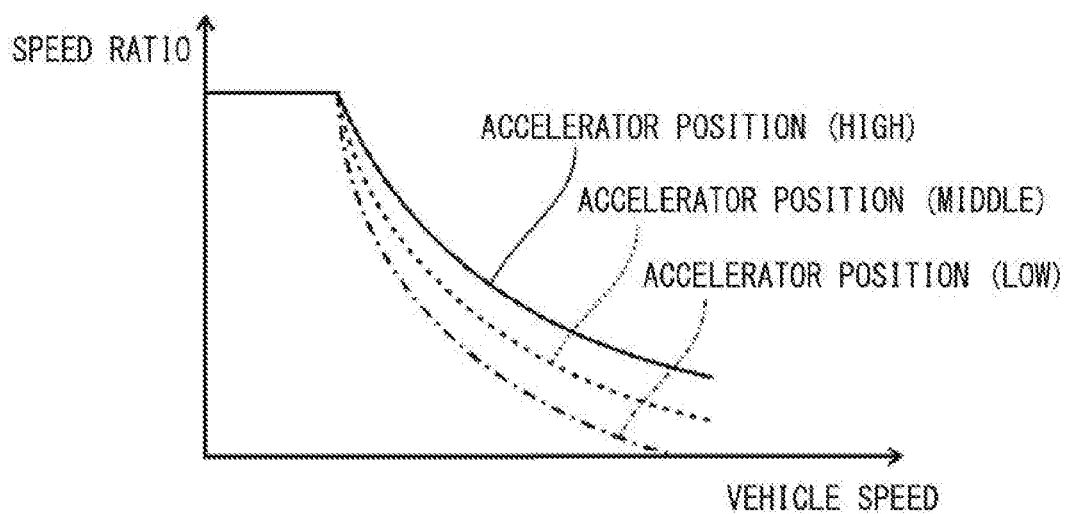
FIG. 3 is a diagram illustrating an example speed-change map.

FIG. 3 illustrates an example of the speed-change map. In FIG. 3, a vertical axis represents a speed ratio, and a horizontal axis represents a vehicle speed. As illustrated in FIG. 3, the speed ratio may decrease as the vehicle speed increases, and may increase as the accelerator position increases.

As described above, in the EV traveling mode, the traveling mode controller 107 may release the output clutch 23 and stop driving the engine 3. Thus, releasing the output clutch 23 may stop the rotational driving of the continuously variable transmission 21. A possible measure to acquire the speed ratio of the continuously variable transmission after the stop of the rotational driving of the continuously variable transmission 21 is to maintain the speed ratio of the continuously variable transmission 21 at a minimum or maximum speed ratio.

Meanwhile, in order to switch the traveling mode from the EV traveling mode to the HEV traveling mode, the traveling mode controller 107 needs to synchronize the number of rotations of the secondary shaft 43 and the number of rotations of the gear shaft 51 before engaging the output clutch 23. The speed ratio controller 109 also needs to change the speed ratio of the continuously variable transmission 21 to a speed ratio (hereinafter also referred to as target speed ratio) variable depending on the vehicle speed and the accelerator position illustrated in FIG. 3.

With the technique of maintaining the speed ratio of the continuously variable transmission at the minimum or maximum speed ratio in the EV traveling mode, the speed ratio of the continuously variable transmission needs to be changed from the minimum or maximum speed ratio to the target speed ratio if the target speed ratio is different from the minimum or maximum speed ratio. This can increase the transition time of the transition mode from the EV traveling mode to the HEV traveling mode, resulting in a longer time lag between the driver's operation to generate required driving power and actual generation of the required driving power.

A possible measure to reduce the transition time of the traveling mode from the EV traveling mode to the HEV traveling mode is to constantly change the speed ratio of the continuously variable transmission to the target speed ratio in the EV traveling mode. However, such a measure needs to engage the output clutch, rotationally drive the continuously variable transmission in a constant manner, and drive the electric oil pump to constantly supply oil pressure to the continuously variable transmission, in order to constantly change the speed ratio of the continuously variable transmission. This can generate energy loss.

To address such a concern, the traveling mode controller 107 according to the example embodiment may set a second threshold TH2 in addition to the first threshold TH1. As illustrated in FIG. 2, the second threshold TH2 may be closer to the EV traveling range R2 than the first threshold TH1. In this example illustrated in FIG. 2, the second threshold TH2 may vary depending on the vehicle speed, similarly to the first threshold TH1. In an example embodiment, the second threshold TH2 may be lower than the first threshold TH1 by a predetermined value. The second threshold TH2 may be preliminarily determined through an experiment, for example, and differ depending on the type of the vehicle. In this example embodiment, the difference between the first threshold TH1 and the second threshold TH2 may be constant; however, the difference between the first threshold TH1 and the second threshold TH2 may differ depending on the vehicle speed. In FIG. 2, "R3" represents an HEV traveling preparation range in which the required driving power is equal to or greater than the second threshold TH2 and less than the first threshold TH1. The HEV traveling preparation range R3 may be a part of the EV traveling range R2. Thus, in the HEV traveling preparation range R3, the engine 3 may be controlled or maintained in the stopped state.

In a case where the vehicle 1 is traveling in the EV traveling mode and where the required driving power is within the HEV traveling preparation range R3, the speed ratio controller 109 may constantly change the speed ratio of the continuously variable transmission 21 to a target speed ratio illustrated in FIG. 3.

For example, in the EV traveling mode, the speed ratio controller 109 may release the input clutch 19b, switch the output clutch 23 from the released state to an engaged state, and rotationally drive the continuously variable transmission 21. The speed ratio controller 109 may also drive the electric oil pump 17 to supply oil pressure to the primary pulley 45 and the secondary pulley 47. The speed ratio controller 109 may thereby change the speed ratio of the continuously variable transmission 21 to the target speed ratio illustrated in FIG. 3.

Accordingly, when the required driving power is shifted from the HEV traveling preparation range R3 to the HEV traveling range R1, the speed ratio of the continuously variable transmission 21 may be changed to the target speed ratio before the input clutch 19b is switched from the released state to the engaged state. This reduces the transition time of the traveling mode from the EV traveling mode to the HEV traveling mode.

In a case where the vehicle 1 is traveling in the EV traveling mode and where the required driving power is within the EV traveling range R2 less than the second threshold TH2, the speed ratio controller 109 may stop controlling the speed ratio of the continuously variable transmission 21. For example, the speed ratio controller 109 may release the input clutch 19b and the output clutch 23, stop rotating the continuously variable transmission 21, and stop driving the electric oil pump 17.

Accordingly, it is possible to reduce energy loss in the EV traveling range R2 in which the required driving power is less than the second threshold TH2, compared with the case in which the speed ratio of the continuously variable transmission 21 is maintained at a predetermined speed ratio or constantly changed. Alternatively, in a case where the required driving power is within the EV traveling range R2, the speed ratio controller 109 may stop controlling the speed ratio of the continuously variable transmission 21 after changing the speed ratio to a predetermined (e.g., minimum or maximum) speed ratio.

Figure 4:
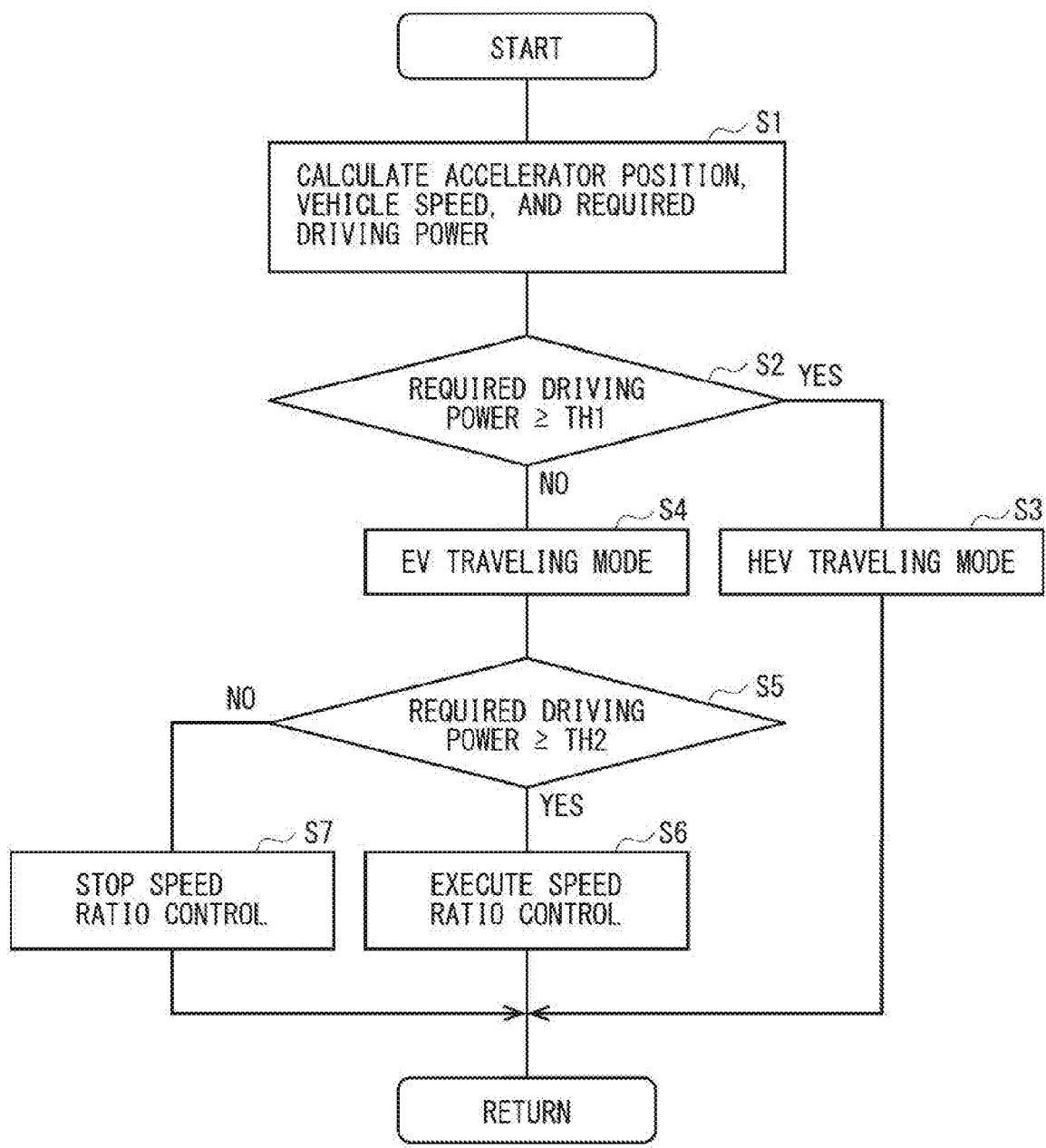
FIG. 4 is a flowchart illustrating a process executed by a vehicle control unit of the vehicle according to one example embodiment of the technology.

FIG. 4 is a flowchart illustrating a process executed by the vehicle control unit 100. First, the vehicle control unit 100 may calculate the accelerator position, the vehicle speed, and the required driving power (Step S1). Thereafter, the vehicle control unit 100 may determine whether the calculated required driving power is equal to or greater than the first threshold TH1 (Step S2). If the required driving power is equal to or greater than the first threshold TH1, i.e., if the required driving power is within the HEV traveling range R1 (Step S2: YES), the vehicle control unit 100 sets the traveling mode to the HEV traveling mode (Step S3). In contrast, if the required driving power is less than the first threshold TH1, i.e., if the required driving power is within the EV traveling range R2 (Step S2: NO), the vehicle control unit 100 sets the traveling mode to the EV traveling mode (Step S4). Thereafter, the vehicle control unit 100 may determine whether the required driving power is equal to or greater than the second threshold TH2 (Step S5).

If the required driving power is equal to or greater than the second threshold TH2, i.e., if the required driving power is within the HEV traveling preparation range R3 (Step S5: YES), the vehicle control unit 100 constantly changes the speed ratio of the continuously variable transmission 21 to the target speed ratio illustrated in FIG. 3. In contrast, if the required driving power is less than the second threshold TH2, i.e., if the required driving power is within the EV traveling range R2 rather than the HEV traveling preparation range R3 (Step S5: NO), the vehicle control unit 100 may stop controlling the speed ratio (Step S7).

As described above, in a case where the required driving power is less than the first threshold TH1 and equal to or greater than the second threshold TH2, the speed ratio controller 109 according to the example embodiment changes the speed ratio of the continuously variable transmission 21 to the target speed ratio. Accordingly, the speed ratio controller 109 makes it possible to reduce the transition time of the traveling mode from the EV traveling mode to the HEV traveling mode and reduce the energy loss. It therefore is possible to reduce mode transition time and energy loss in a compatible way.

In the example embodiment described above, the speed ratio controller 109 may change the speed ratio of the continuously variable transmission 21 to the target speed ratio in a case where the required driving power is within the HEV traveling preparation range R3; however, this example embodiment is a non-limiting example. In another example embodiment, the speed ratio controller 109 may change the speed ratio of the continuously variable transmission 21 in a case where the required driving power and the vehicle speed are within the EV traveling range R2 less than the second threshold TH2 and where an environment around the vehicle 1 satisfies a predetermined condition. For example, the speed ratio controller 109 may change the speed ratio of the continuously variable transmission 21 to the target speed ratio in a case where an environment in front of the vehicle 1 is determined as satisfying a predetermined condition (e.g., when the vehicle 1 is determined as traveling on an uphill road or traveling through a merging point of speedways) on the basis of data on position of the vehicle 1 and map data. Accordingly, when the vehicle 1 is traveling on an uphill road or through a merging point of speedways, it is possible to reduce the time lag between the driver's operation to generate required driving power and actual generation of the required driving power.

MODIFICATION EXAMPLES

Figure 5:
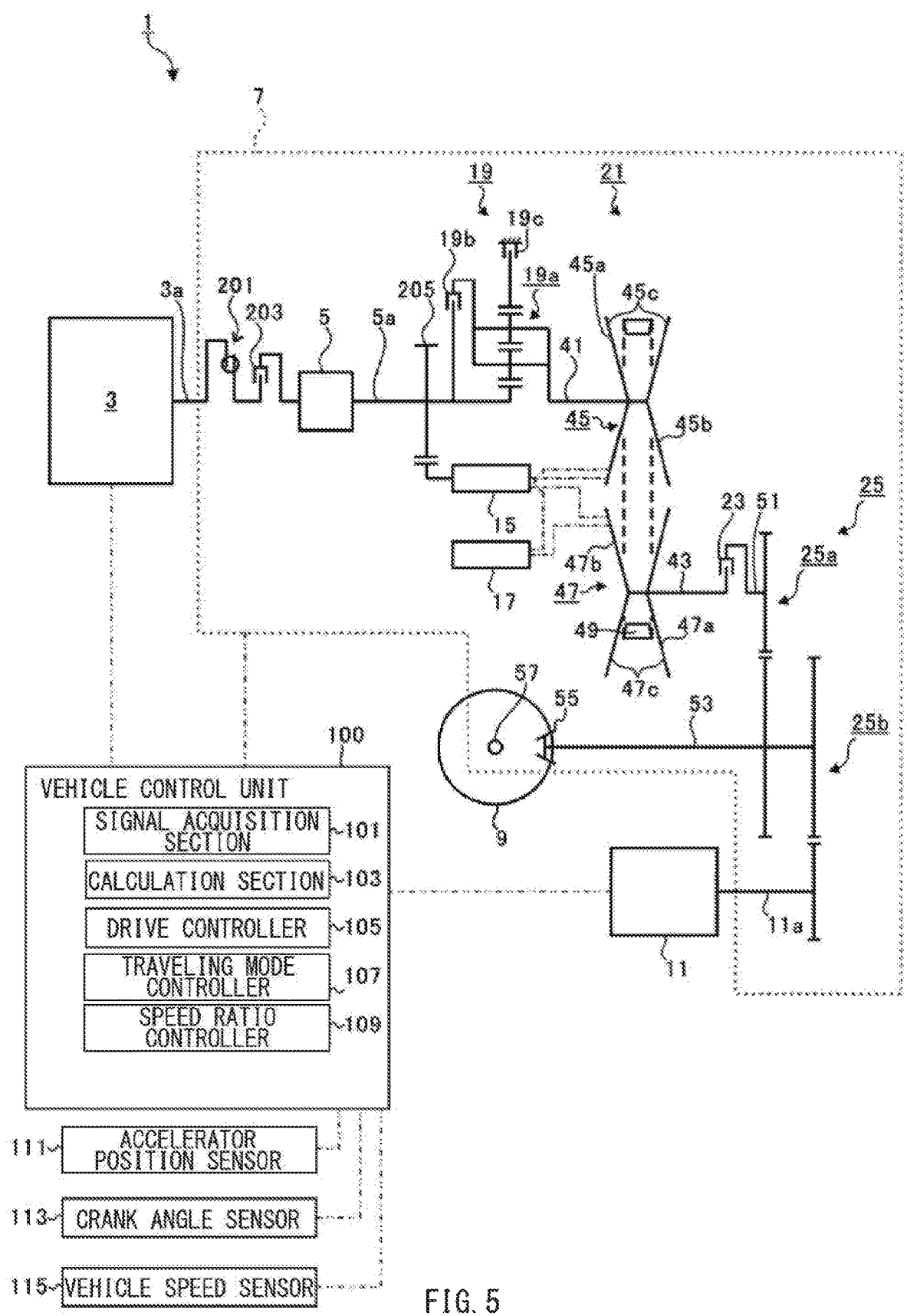
FIG. 5 is a diagram illustrating an example configuration of a vehicle according to a modification example of the technology.

FIG. 5 illustrates an example configuration of the vehicle 1 according to a modification example. Components substantially the same as those in the example embodiments described above are assigned with the same reference numerals without redundant description. As illustrated in FIG. 5, the vehicle 1 according to the modification example may include no torque converter 13 described in the foregoing example embodiment. The vehicle 1 according to the modification example may include the ISG 5 at the position where the torque converter 13 is provided in the example embodiments described above. In one embodiment, the ISG 5 may serve as an "auxiliary motor". The power transmission apparatus 7 of the modification example may include a damper mechanism 201, an engine separation clutch 203, and a pump driving gear 205.

The damper mechanism 201 may be disposed between the crank shaft 3a of the engine 3 and the rotary shaft 5a of the ISG 5. The damper mechanism 201 may absorb vibration transmitted from the engine 3 via the crank shaft 3a to prevent the vibration from being transmitted from the engine 3 to the rotary shaft 5a.

The engine separation clutch 203 may be disposed between the damper mechanism 201 and the ISG 5. When being released, the engine separation clutch 203 may cut off the transmission of the driving power between the crank shaft 3a and the rotary shaft 5a. The engine separation clutch 203 may thereby prevent the driving power of the ISG 5 from being transmitted to the engine 3. When being engaged, the engine separation clutch 203 may cause the crank shaft 3a and the rotary shaft 5a to rotate integrally with each other to transmit driving power from the rotary shaft 5a to the crank shaft 3a. The ISG 5 may thereby start (restart) the engine 3.

The pump driving gear 205 may be provided on the rotary shaft 5a and between the ISG 5 and the forward/backward movement switching device 19. The pump driving gear 205 may be coupled to the mechanical oil pump 15. This configuration allows the mechanical oil pump 15 to generate oil pressure when the rotary shaft 5a (or the pump driving gear 205) rotates.

Figure 6:
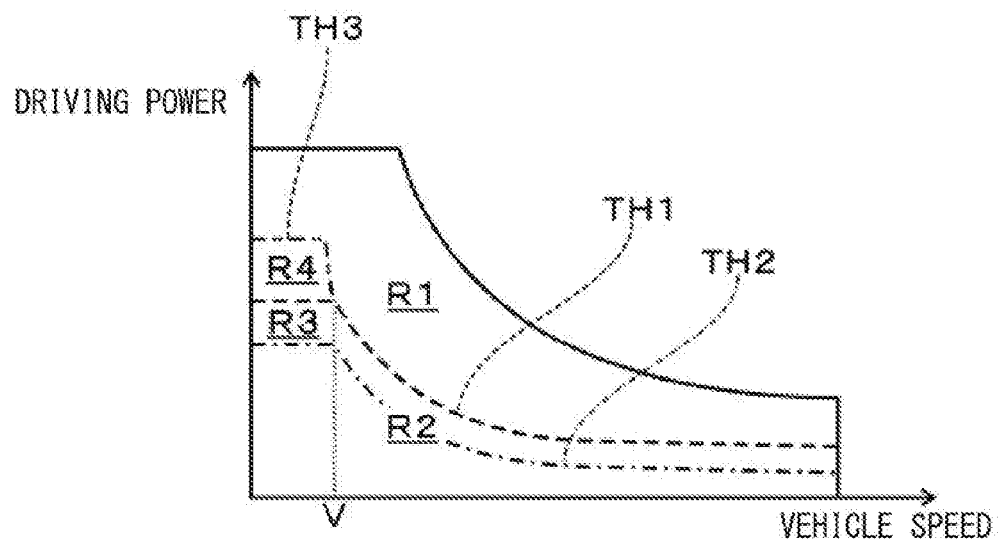
FIG. 6 is a diagram illustrating driving power in each traveling mode of the vehicle according to a modification example of the technology.

FIG. 6 illustrates driving power of the vehicle 1 of the modification example in each traveling mode. In FIG. 6, a vertical axis represents required driving power, and a horizontal axis represents a vehicle speed. In FIG. 6, "TH3" represents a third threshold, and "R4" represents another HEV traveling preparation range. The third threshold TH3 may be variable depending on the vehicle speed, similarly to the first threshold TH1 and the second threshold TH2. The third threshold TH3 may correspond to the sum of the first threshold TH1 and the driving power of the ISG 5. The third threshold TH3 may be set within a range equal to or less than a predetermined vehicle speed V illustrated in FIG. 6. The HEV traveling preparation range R4 may be a part of the EV traveling range R2. In the HEV traveling preparation range R4, the required driving power is equal to or greater than the first threshold TH1 and less than the third threshold TH3. In the modification example described above, the HEV traveling preparation range R4 may be provided in addition to the HEV traveling preparation range R3 described in the example embodiments described above.

As illustrated in FIG. 6, in a case where the required driving power is within the HEV traveling range R1 equal to or greater than the third threshold TH3, the traveling mode controller 107 may set the traveling mode of the vehicle 1 to the HEV traveling mode. In a case where the required driving power is within the EV traveling range R2 less than the third threshold TH3, the traveling mode controller 107 may set the traveling mode of the vehicle 1 to the EV traveling mode. In the modification example described above, the traveling mode controller 107 may further set the third threshold TH3 and the HEV traveling preparation range R4. The third threshold TH3 may be greater than the first threshold TH1 and set within a range equal to or less than a predetermined vehicle speed. The HEV traveling preparation range R4 may be set within the HEV traveling range R1 of the example embodiments described above. This expands the range of the EV traveling mode.

In the modification example, the speed ratio controller 109 may change the speed ratio of the continuously variable transmission 21 to a minimum speed ratio or a maximum speed ratio on the basis of the vehicle speed in a case where the vehicle 1 is traveling in the EV traveling mode and where the required driving power is within the HEV traveling preparation range R3. For example, in a case where the vehicle speed of the vehicle 1 is less than the predetermined vehicle speed V (e.g., 45 km/h), the speed ratio controller 109 may change the speed ratio of the continuously variable transmission 21 to the maximum speed ratio and maintain the maximum speed ratio. In a case where the vehicle speed of the vehicle 1 is equal to or greater than the predetermined vehicle speed V, the speed ratio controller 109 may change the speed ratio of the continuously variable transmission 21 to the minimum speed ratio and maintain the minimum speed ratio.

In an example case where the vehicle 1 is traveling in the EV traveling mode; where the required driving power is within the HEV traveling preparation range R3; and where the vehicle speed is less than the predetermined vehicle speed V, the speed ratio controller 109 may release the engine separation clutch 203 and the input clutch 19b. Thereafter, the speed ratio controller 109 may switch the output clutch 23 from the released state to the engaged state, rotationally drive the continuously variable transmission 21, and drive the electric oil pump 17 to supply oil pressure to the primary pulley 45 and the secondary pulley 47. The speed ratio controller 109 may change the speed ratio of the continuously variable transmission 21 to the maximum speed ratio and maintain the maximum speed ratio.

In an example case where the vehicle 1 is traveling in the EV traveling mode; where the required driving power is within the HEV traveling preparation range R3; and where the vehicle speed is equal to or greater than the predetermined vehicle speed V, the speed ratio controller 109 may release the engine separation clutch 203 and the input clutch 19b. Thereafter, the speed ratio controller 109 may switch the output clutch 23 from the released state to the engaged state, rotationally drive the continuously variable transmission 21, and drive the electric oil pump 17 to supply oil pressure to the primary pulley 45 and the secondary pulley 47. The speed ratio controller 109 may change the speed ratio of the continuously variable transmission 21 to the minimum speed ratio and maintain the minimum speed ratio.

As described above with reference to FIG. 3, the target speed ratio to be set in the HEV traveling mode may become closer to the maximum speed ratio as the vehicle speed decreases and may become closer to the minimum speed ratio as the vehicle speed increases. Accordingly, the speed ratio controller 109 may set the maximum speed ratio in a case where the vehicle speed is less than the predetermined vehicle speed V. This reduces the time for changing the speed ratio to the target speed ratio, compared with the case in which the minimum speed ratio is set. Moreover, the speed ratio controller 109 may set the minimum speed ratio in a case where the vehicle speed is equal to or greater than the predetermined vehicle speed V. This reduces the time for changing the speed ratio to the target speed ratio, compared with the case in which maximum speed ratio is set.

Accordingly, it is possible to reduce the transition time of the traveling mode from the EV traveling mode to the HEV traveling mode when the required driving power is shifted from the HEV traveling preparation range R3 to the HEV traveling range R1.

Further, the speed ratio controller 109 may stop controlling the speed ratio of the continuously variable transmission 21 in a case where the vehicle 1 is traveling in the EV traveling mode and where the required driving power is within the EV traveling range R2 less than the second threshold TH2. For example, the speed ratio controller 109 may release the engine separation clutch 203, the input clutch 19b, and the output clutch 23, and stop rotationally driving the continuously variable transmission 21.

Accordingly, it is possible to reduce energy loss in the EV traveling range R2 in which the required driving power is less than the second threshold TH2, compared with a case where the speed ratio of the continuously variable transmission 21 is maintained at a predetermined speed ratio or constantly changed. Alternatively, in a case where the required driving power is within the EV traveling range R2, the speed ratio controller 109 may stop controlling the speed ratio of the continuously variable transmission 21 after changing the speed ratio to a predetermined (e.g., minimum or maximum) speed ratio.

Further, in a case where the vehicle 1 is traveling in the EV traveling mode and where the required driving power and the vehicle speed are within the HEV traveling preparation range R4, the speed ratio controller 109 may release the engine separation clutch 203. The speed ratio controller 109 may then switch the input clutch 19b and the output clutch 23 from the released state to the engaged state to drive the ISG 5. In this way, the speed ratio controller 109 may cause the driving power of the drive motor 11 and the driving power of the ISG 5 to be transmitted to the drive wheel 9. The speed ratio controller 109 may rotationally drive the continuously variable transmission 21 using the drive motor 11 and the ISG 5, and drive the mechanical oil pump 15 (or the electric oil pump 17) to supply oil pressure to the primary pulley 45 and the secondary pulley 47. The speed ratio controller 109 may change the speed ratio of the continuously variable transmission 21 to the maximum speed ratio and maintain the maximum speed ratio.

Accordingly, it is possible to reduce the transition time of the traveling mode from the EV traveling mode to the HEV traveling mode when at least one of the required driving power or the vehicle speed is shifted from the HEV traveling preparation range R4 to the HEV traveling range R1.

Figure 7:
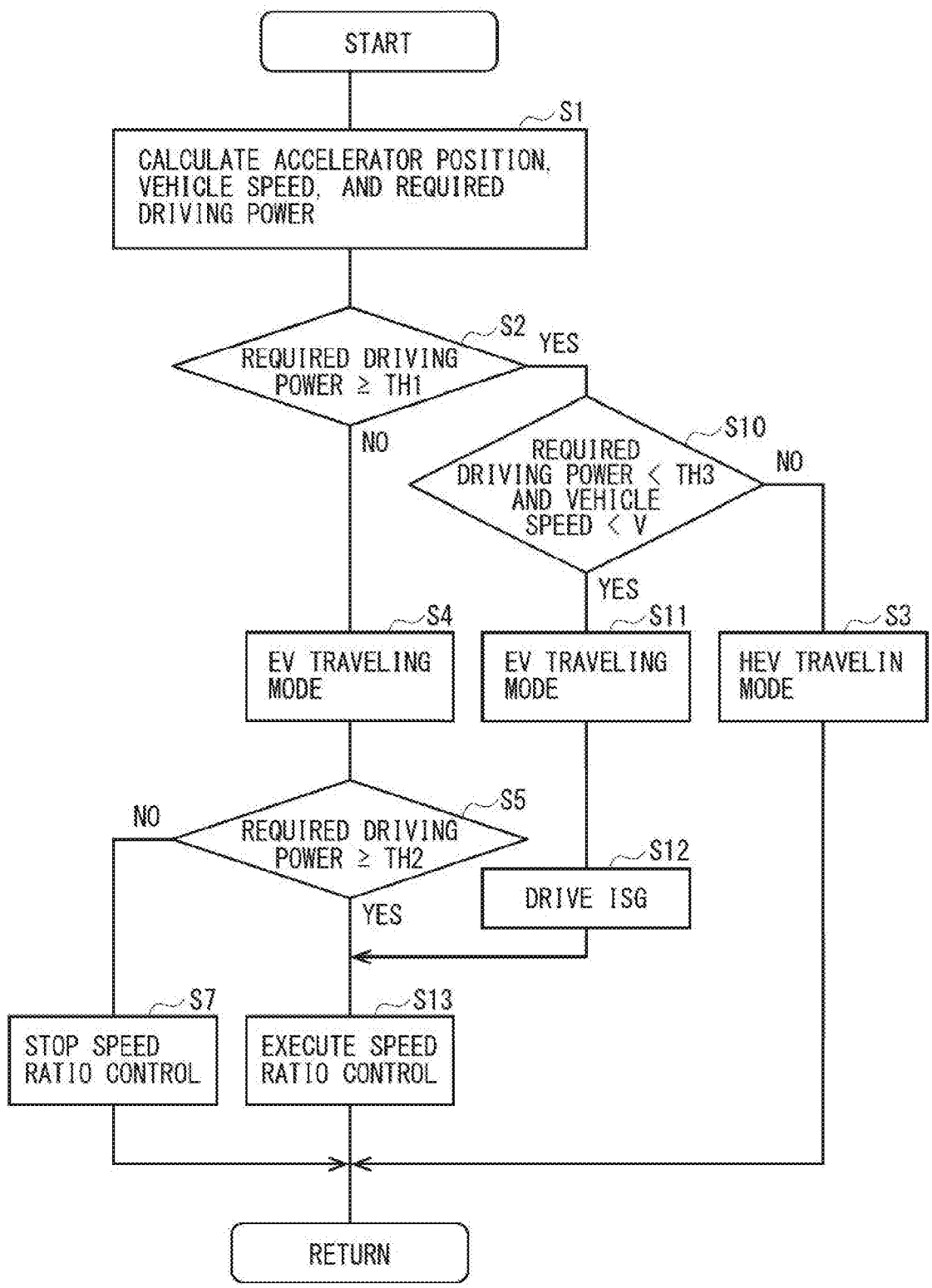
FIG. 7 is a flowchart illustrating a process executed by a vehicle control unit of the vehicle according to a modification example of the technology.

FIG. 7 is a flowchart illustrating a process executed by the vehicle control unit 100 according to the modification example. Steps substantially the same as those in the example embodiments described above are assigned with the same reference numerals without redundant description.

First, the vehicle control unit 100 may calculate the accelerator position, the vehicle speed, and the required driving power (Step S1). Thereafter, the vehicle control unit 100 may determine whether the calculated required driving power is equal to or greater than the first threshold TH1 (Step S2). If the required driving power is equal to or greater than the first threshold TH1 (Step S2: YES), the vehicle control unit 100 may determine whether the required driving power is less than the third threshold TH3 and whether the vehicle speed is less than the predetermined vehicle speed V (Step S10). If these conditions in Step S10 are not satisfied, i.e., if the required driving power is within the HEV traveling range R1 (Step S10: NO), the vehicle control unit 100 may set the traveling mode to the HEV traveling mode (Step S3).

In contrast, if these conditions in Step S10 are satisfied, i.e., if the required driving power and the vehicle speed are within the HEV traveling preparation range R4 (Step S10: YES), the vehicle control unit 100 may set the traveling mode to the EV traveling mode (Step S11) and drive the ISG 5 to transmit the driving power of the drive motor 11 and the driving power of the ISG 5 to the drive wheel 9 (Step S12). At that time, the engine separation clutch 203 may be released, and the input clutch 19b and the output clutch 23 may be engaged, as described above. Thereafter, the vehicle control unit 100 may control the speed ratio (Step S13). For example, the vehicle control unit 100 may change the speed ratio of the continuously variable transmission 21 to the maximum speed ratio in a case where the vehicle speed is less than the predetermined vehicle speed V, and may change the speed ratio of the continuously variable transmission 21 to the minimum speed ratio in a case where the vehicle speed is equal to or greater than the predetermined vehicle speed V. In a case where the required driving power is within the HEV traveling preparation range R4, the vehicle control unit 100 may change the speed ratio of the continuously variable transmission 21 to the maximum speed ratio because the vehicle speed is less than the predetermined vehicle speed V.

If the required driving power is less than the first threshold TH1 (Step S2: NO), the vehicle control unit 100 may set the traveling mode to the EV traveling mode (Step S4) and determine whether the required driving power is equal to or greater than the second threshold TH2 (Step S5). If the required driving power is equal to or greater than the second threshold TH2, i.e., if the required driving power is within the HEV traveling preparation range R3 (Step S5: YES), and if the vehicle speed is less than the predetermined vehicle speed V, the vehicle control unit 100 may change the speed ratio of the continuously variable transmission 21 to the maximum speed ratio (Step S13). If the required driving power is equal to or greater than the second threshold TH2, i.e., if the required driving power is within the HEV traveling preparation range R3 (Step S5: YES), and if the vehicle speed is equal to or greater than the predetermined vehicle speed V, the vehicle control unit 100 may change the speed ratio of the continuously variable transmission 21 to the minimum speed ratio (Step S13). In contrast, if the required driving power is less than the second threshold TH2 (Step S5: NO), the vehicle control unit 100 may stop controlling the speed ratio (Step S7).

The modification example may provide workings and effects similar to those in the example embodiments described above. In the modification example, in a case where the required driving power is equal to or greater than the first threshold TH1 and less than the third threshold TH3 and where the vehicle speed is less than the predetermined vehicle speed V, the input clutch 19b and the output clutch 23 may be engaged, and the ISG 5 may be driven to transmit the driving power of the drive motor 11 and the driving power of the ISG 5 to the drive wheel 9. According to the modification example, the EV traveling range R2 is expanded depending on the driving power of the ISG 5. It is therefore possible to further improve the efficiency in electric power consumption.

It should be appreciated that the foregoing example embodiments and modification example of the technology are merely illustrative and non-limiting examples and are not intended to limit the scope of the technology. It should be also appreciated that various omissions, replacements, and modifications may be made by a person skilled in the art in the foregoing example embodiments and modification example described herein, without departing from the scope of the technology. The technology is intended to include such modifications and alterations in so far as they fall within the scope of the appended claims or the equivalents thereof.

According to some example embodiments described above, the speed ratio controller 109 may change the speed ratio of the continuously variable transmission 21 to the target transmission ratio in a case where the required driving power is within the HEV traveling preparation range R3; however, these example embodiments are non-limiting examples. In another example embodiment, in a case where the required driving power is within the HEV traveling preparation range R3, the speed ratio controller 109 may change the speed ratio of the continuously variable transmission 21 to the minimum speed ratio or the maximum speed ratio on the basis of the vehicle speed, as in the modification example described above.

According to the modification example described above, the speed ratio controller 109 may change the speed ratio of the continuously variable transmission 21 to the minimum speed ratio or the maximum speed ratio within the HEV traveling preparation ranges R3 and R4; however, the modification example is a non-limiting example. In another example embodiment, in a case where the required driving power is within the HEV traveling preparation ranges R3 and R4, the speed ratio controller 109 may constantly change the speed ratio of the continuously variable transmission 21 to the target speed ratio determined on the basis of the accelerator position and the vehicle speed.

One or both of the traveling mode controller 107 and the speed ratio controller 109 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the traveling mode controller 107 and the speed ratio controller 109. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the traveling mode controller 107 and the speed ratio controller 109 illustrated in FIG. 1.

The invention claimed is:

1. A vehicle comprising:
an engine;
a continuously variable transmission coupled to the engine and configured to transmit driving power of the engine to a drive wheel;
an output clutch disposed between the continuously variable transmission and the drive wheel;
a drive motor coupled between the output clutch and the drive wheel;
a traveling mode controller configured to switch a traveling mode of the vehicle between a first traveling mode and a second traveling mode, the traveling mode controller causing driving power of the drive motor to be transmitted to the drive wheel while releasing the output clutch in the first traveling mode, the traveling mode controller causing the driving power of the engine and the driving power of the drive motor to be transmitted to the drive wheel while engaging the output clutch in the second traveling mode; and
a speed ratio controller configured to control a speed ratio of the continuously variable transmission, wherein
the traveling mode controller is configured to
   switch the traveling mode to the first traveling mode in a case where required driving power determined on a basis of an accelerator position is less than a first threshold, and
switch the traveling mode to the second traveling mode in a case where the required driving power is equal to or greater than the first threshold, and
the speed ratio controller is configured to cause the speed ratio to change depending on a vehicle speed of the vehicle in a case where the required driving power is less than the first threshold and equal to or greater than a second threshold, the second threshold being set to a value less than the first threshold.

2. The vehicle according to claim 1, further comprising:
an auxiliary motor coupled between the engine and the continuously variable transmission; and
an engine separation clutch disposed between the engine and the auxiliary motor, wherein
the traveling mode controller is configured to
   switch the traveling mode to the first traveling mode in a case where the required driving power is less than a third threshold, the third threshold corresponding to a sum of the first threshold and driving power of the auxiliary motor, and
   switch the traveling mode to the second traveling mode in a case where the required driving power is equal to or greater than the third threshold, and
the speed ratio controller is configured to cause, in a case where the required driving power is equal to or greater than the first threshold and less than the third threshold and where the vehicle speed is less than a predetermined vehicle speed, the driving power of the drive motor and the driving power of the auxiliary motor to be transmitted to the drive wheel while engaging the output clutch and releasing the engine separation clutch.

3. A vehicle comprising:
an engine;
a continuously variable transmission coupled to the engine and configured to transmit driving power of the engine to a drive wheel;
an output clutch disposed between the continuously variable transmission and the drive wheel;
a drive motor coupled between the output clutch and the drive wheel; and
circuitry configured to
switch a traveling mode of the vehicle between a first traveling mode and a second traveling mode, the circuitry causing driving power of the drive motor to be transmitted to the drive wheel while releasing the output clutch in the first traveling mode, the circuitry causing the driving power of the engine and the driving power of the drive motor to be transmitted to the drive wheel while engaging the output clutch in the second traveling mode,
switch the traveling mode to the first traveling mode in a case where required driving power determined on a basis of an accelerator position is less than a first threshold,
switch the traveling mode to the second traveling mode in a case where the required driving power is equal to or greater than the first threshold,
control a speed ratio of the continuously variable transmission, and
cause the speed ratio of the continuously variable transmission to change depending on a vehicle speed of the vehicle in a case where the required driving power is less than the first threshold and equal to or greater than a second threshold, the second threshold being set to a value less than the first threshold.

* * * * *